May 19, 1970  R. R. GLASS ET AL  3,512,516
COMBINED FOOD PACKAGING AND FOOD COOKING DEVICE
Filed June 4, 1968
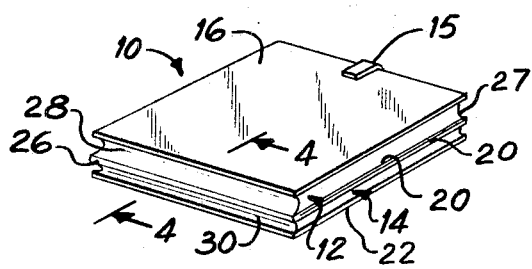
FIG. 1
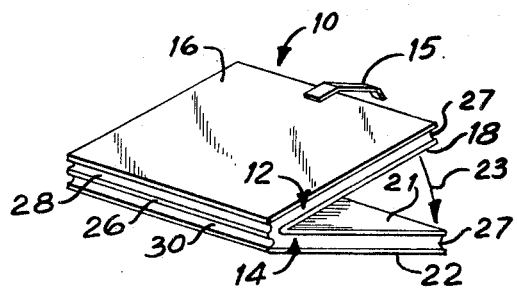
FIG. 2
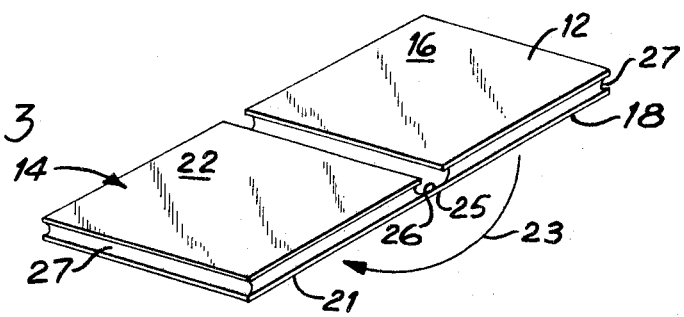
FIG. 3
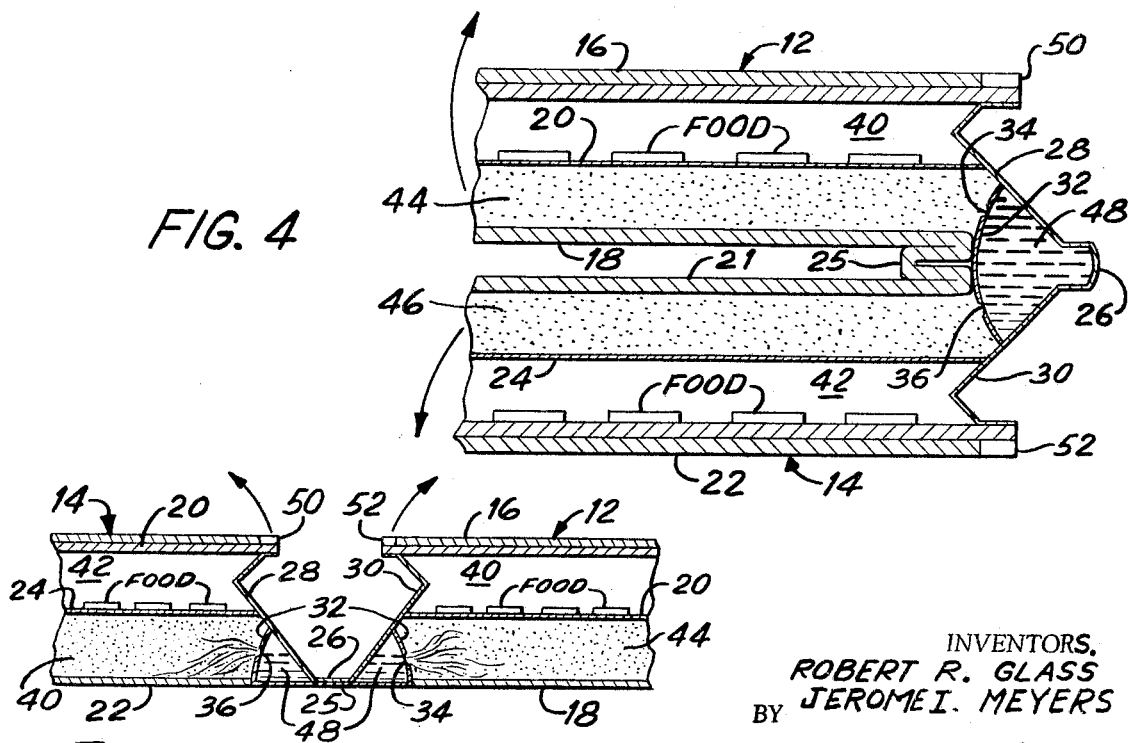
FIG. 4
FIG. 5
INVENTORS.
ROBERT R. GLASS
JEROME I. MEYERS
BY
Kenneth S. Goldfarb 3,512,516
COMBINED FOOD PACKAGING AND
FOOD COOKING DEVICE
Robert R. Glass and Jerome I. Meyers, both of 25
Central Park W., New York, N.Y. 10023
Filed June 4, 1968, Ser. No. 734,462
Int. Cl. F24j 1/00
U.S. Cl. 126—263     7 Claims

ABSTRACT OF THE DISCLOSURE

This invention relates to a package for storing and heating food comprising at least one compartment for storing food and means for heating food by an exothermic physiochemical reaction effected by the mixing of a chemical compound and a liquid at a location isolated from the food storing compartment.

---

This invention relates to packages for storing food which include means for cooking or heating the food while it is in the package, and more particularly to packages for storing preheated and preserved foods.

Heretofore, packages for food have merely been of the storage type. While "cooking pouches" for immersion of the food stored therein into boiling water are known, such means are not particularly suitable when the user is in a situation requiring the food to be virtually instantaneously prepared with a minimum of expended effort.

It is therefore a primary object of this invention to provide a package for storing food, which package provides means for heating or cooling of the food contained in the package.

It is another object of this invention to provide a package for the storing and heating or cooling of food, the means being provided for the heating of the food being safe and readily available to the user.

An additional object of this invention resides in the provision of a package for storing and heating food having novel physiochemical means for effecting heating or cooling of the food stored therein.

Still further objects and features of this invention reside in the provision of a package for storing and heating and cooling food, which package is compact, simple to use and capable of dispensing "heat" in a uniform manner so that the package has great utility for persons engaged in outdoor pursuits.

In the present invention there is provided a novel packaging means for storing food which comprises a container which is divided into a plurality of separate closed compartments. The first compartments are adapted to receive a quantity of food which has been partially precooked and preserved in accordance with known techniques so as to lengthen shelf life. The other compartments contain a substance which upon a chemical or physical reaction, omits or absorbs heat, said package having means for instituting the physical or chemical change and the resultant reaction.

In a preferred embodiment of the invention the chemical substance is contained in the separate closed compartments which substance spontaneously undergoes an exothermic or endothermic reaction on mixing with the contents of a further compartment of the package. The reactants contained in these two compartments are automatically combined by breaking a common rupturable wall between the compartments in the package. The wall between these two compartments is rupturable upon the opening of the package from its storage position to the cooking position. The exothermic reaction is more easily effected than the endothermic reaction since there are many inexpensive, suitable reactants available which upon mixture thereof undergo an exothermic reaction releasing sufficient energy to heat the food in the food compartment of the package.

The preferred reactants are calcium oxide and water. Upon breaking of the rupturable wall between the water and calcium oxide compartments the water will enter into the calcium oxide compartment and mix freely with the calcium oxide, thus undergoing a strong exothermic reaction which is not so violent as to be uncontrolled or unpredictable. Examples of other suitable reactants are other alkaline earth metal oxides and alkali metal oxides and hydroxides, specific examples being sodium oxide and sodium hydroxide.

The heat produced in the reaction is transferred to the first compartments containing the food by conduction from the compartment containing the reactants and in the course of a few minutes the food is heated to the desired temperature without any contact by the reactants with the food products.

When the food in the food compartment has been heated to the desired temperature, access is obtained by opening the food compartment, for example, by means of a tear-tab or pull-tab, without breaking the wall between the food compartment and the compartments containing the reactants.

It will be appreciated that where reaction is endothermic, heat will be extracted from the food compartment and the food will be cooled. This will obviously be desirable with some kinds of food.

While the most convenient manner of carrying the invention into effect is by the use of chemical reactants, it is also possible to utilize a physical change to bring about the heating or cooling. Thus if one of the two separate closed compartments contains an easily vaporizable liquid, such as a refrigerant, air may be pumped through the compartment containing the refrigerant by suitable means such as a bellows and allowed to escape to atmosphere carrying refrigerant vapor with it. The latent heat of vaporization of the liquid will be thus extracted from the food compartment which will then be cooled.

It will be appreciated that throughout the specification the word "food" is used to include both solid and liquid foods. Also the term is not limited to food of a particular nutritive value and includes all edible substances, for example, certain drinks with little or no nutritional value.

The package may be made from aluminum foil having a thickness preferably of at least .003 inch so as to avoid the possibility of pin holes. The foil desirably has a vinyl coating and the edges of the horizontal walls are permanently adhered to the side wall as by heat sealing and/or cementing.

The quantity of the solid reactant may vary, depending upon the quantity of food in the food compartment. Preferably, calcium oxide which is inexpensive and reacts with desired speed but without explosive violence is used as the chemical substance. In general, it may be said that 4 ounces of water and of calcium oxide will provide an approved measure of heat. Instead of the calcium oxide, sodium hydroxide may be used since it is not corrosive and produces no substantial quantity of gas when reacted with water. Alternatively other chemicals such as $Na_2O$ which has a two-stage reaction in the production of the heat may be used. If a reactant is used, which is somewhat corrosive or which is capable of attacking aluminum, the aluminum foil may be replaced by some of the newer kinds of stainless steel foils.

It will be appreciated that the food package of the present invention has great utility for survival packs, general issue to military personnel, and use by explorers, mountain climbers and other people in outdoor pursuits.

These, together with the various ancillary objects and features of this invention, which will become apparent as the following description proceeds, are attained by this package, preferred embodiments of which have been illustrated in the accompanying drawings, by way of example only, wherein:

FIG. 1 is a perspective view of the package in its storage position according to the concepts of the instant invention;

FIG. 2 is a view similar to that show in FIG. 1, wherein the closure means is partially open;

FIG. 3 is a perspective view of the package, wherein the top section is completely rotated from its storage position to its cooking position;

FIG. 4 is a fragmentary vertical sectional view of one embodiment of the package taken along the plane of line 4—4 in FIG. 1; and FIG. 5 is a fragmentary sectional view of one embodiment of the package, the top section being completely rotated to its cooking position.

With continuing reference to the accompanying drawings, wherein like reference numerals designate similar parts throughout the various views, reference numeral 10 is used to generally designate the package of the present invention. The package 10 includes a compartmentalized top section 12 and a compartmentalized bottom section 14 and a tear tab or other closure means 15. Top section 12 has an upper wall 16, a lower wall 18 and a central partition 20 of heat transferable material, for example, aluminum, stainless steel, and the like. Similarly, bottom section 14 includes an upper wall 21, a lower wall 22 and a central partition 24. The lower wall 18 of the top section 12 and the upper wall 20 of the bottom section 14 are connected by any suitable hinge means, for example, a gusset 25 as shown in FIG. 4. The pancake 10 is further provided wth an end wall 26 having a V-shape when viewed in vertical cross section, as seen in FIG. 4, interconnecting the upper wall 16 of the top section 12 with the lower wall 22 of the bottom section 14, the gusset 26 or other hinge means permitting rotation of top section 12 from its closed storage position about bottom section 14 in the direction of arrow 23 so that end wall 26 assumes the modified V-shape illustrated by FIG. 5 when the package 10 is in its open position. Connected to interior adjacent sides 28 and 30 of V-shaped end wall 26 is a frangible membrane 32 having spaced preweakened portions 34 and 36, the frangible membrane 32 being slightly spaced from the gusset 25 or other hinge means. A peripheral wall 27 is integral with end wall 26 and may optionally be accordion pleated as shown in the embodiments illustrated in FIGS. 1-5.

The volume enclosed in top section 12, by upper wall 16, central portion 20, peripheral wall 27 and end wall 26 defines a first compartment 40 which in this invention is used for storage of precooked food. Likewise, lower wall 22, central partition 24, peripheral wall 27 and end wall 26 in bottom section 14 define a second food compartment 42. A second pair of compartments 44 and 46 in the top section 12 and bottom section 14, respectively, are defined by central portions 20 and 24, lower wall 18, upper wall 20, peripheral wall 27 and the upper and lower portions of frangible membrane 32 contain the chemical substance which, under conditions that will be described more fully hereinbelow, reacts with another chemical substance to emit or absorb heat for heating or cooling of food stored in compartments 40 and 42. Frangible membrane 32, secured to and extending between spaced locations of end wall 26, defines a third compartment 48 for a liquid to be reacted with the chemical substance stored in compartments 44 and 46.

Upon rotation of top section 12 from its storage position to its cooking position, pressure exerted by liquid reactant stored in compartment 48 against frangible membrane 32 will cause the preweakened portions 34 and 36 to rupture with a simultaneous flow of liquid into each of compartments 44 and 46 containing the chemical substance. Instantaneously, upon contact of the liquid with the chemical substance, reaction will commence with resulting heating or cooling of the food stored in compartments 40 and 42. The preheated food, having dropped to the surface of central partitions 20 and 24 of heat transferable material upon relative rotation of top section 12 and bottom section 14 to their open cooking position will be evenly heated. The heated food may be removed by pull tabs 50 and 52 when the heating operation is finished. In one embodiment of the invention the walls of the food compartments expand upon heating indicating that the process is completed.

It is further contemplated as an integral feature of this invention that the liquid contained within the third compartment 48 has an additive therein which serves as an anti-freezing agent, which additive produces the well-known effect of retarding freezing of liquid in the third compartment by lowering the freezing point of the liquid in which the additive is dissolved.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

We claim:

1. A package for storing and heating food comprising at least one first compartment for storing food, means for heating food by an exothermic physiochemical reaction effected by the mixing of a chemical compound and a liquid at a location isolated from but adjacent to said first compartment, said means including at least one second compartment for said chemical compound and a third compartment for said liquid, said second and third compartments being separated by a severable membrane which when ruptured permits said liquid to flow from said third compartment to said second compartment to permit said exothermic physiochemical reaction to commence thereby heating the food stored in said first compartment, there being a pair of first compartments and a pair of second compartments, each one of said first compartments and each one of said second compartments being closely adjacent to each other and separated by relatively thin partitions of heat transferable material and defining a pair of sections, each section including an upper wall and a lower wall with the sections initially superposed so that the lower wall of the upper section is closely adjacent the upper wall of said lower section, imperforate means hingedly interconnecting said lower wall of the upper section and the upper wall of said lower section to prevent fluid flow therebetween while permitting rotation about said imperforate means of said setcions relative to each other, an end wall interconnecting the upper wall of the upper section and the lower wall of said lower section, said partitions being connected to said end wall, and frangible membrane means secured to and extending between spaced locations of said end wall to define with the part of said end wall between said spaced locations said third compartment so that upon rotation of one section relative to the other, said membrane will rupture permitting liquid to enter said pair of second compartments.

2. A package for storing and heating food according to claim 1, said membrane having a pair of spaced weakened portions in alignment with said second compartments so that substantially equal amounts of liquid will flow into each of said second compartments.

3. A package for storing and heating food according to claim 1, wherein said chemical compound is a member selected from the class consisting of alkali metal oxides and alkaline earth oxides and wherein said liquid is water.

4. A package for storing and heating food according to claim 3, wherein said chemical compound is calcium oxide.

5. A package for storing and heating food according to claim 4, wherein calcium oxide and water are used in equal parts by weight.

6. A package for storing and heating food according to claim 4, wherein powered aluminum is intermixed with said calcium oxide.

7. A package for storing and heating food according to claim 1, wherein said third compartment is protected by a separate outer wall extending outwardly of said first and second compartments to prevent accidental rupture of the membrane of said third compartment.

References Cited

UNITED STATES PATENTS

| 820,638 | 5/1906 | Gabriel | 126—263 |
| 2,384,720 | 9/1945 | Babcock et al. | 126—263 |
| 3,149,943 | 9/1964 | Amador. | |

FOREIGN PATENTS 471,617   2/1951   Canada.

CHARLES J. MYHRE, Primary Examiner